March 25, 1924.

D. B. MILLER

HEXAGONAL DIE

Filed Feb. 21, 1922

1,488,271

INVENTOR,
David B. Miller,
BY Harry W. Bowen.
ATTORNEY.

Patented Mar. 25, 1924.

1,488,271

UNITED STATES PATENT OFFICE.

DAVID B. MILLER, OF GREENFIELD, MASSACHUSETTS.

HEXAGONAL DIE.

Application filed February 21, 1922. Serial No. 538,285.

*To all whom it may concern:*

Be it known that I, DAVID B. MILLER, a citizen of the United States of America, residing at Greenfield, in the county of Franklin, Commonwealth of Massachusetts, have invented certain new and useful Improvements in Hexagonal Dies, of which the following is a specification.

This invention relates to improvements in dies for cutting screw threads and more particularly to that which is known in the are as hexagonal shaped dies that is to say in which the outside surface is of the form of a hexagon. This form of die possesses the advantage of permitting the operator to cut a thread on a bolt which is located in a small or cramped space.

An object of the present invention is to provide a hexagonal shaped die which permits the same to be used where a square or four sided die could not be operated since a wrench or other tool could not be applied, but by using a six sided die a wrench could be applied and a thread cut.

A further object is to provide a screw cutting die of hexagonal form in which an opening is formed in one side for adjustment of the same to vary the cutting size.

A further object is to provide a screw cutting die of hexagonal form having an opening in one side and having means for drawing the sides together to vary the size of the cut.

A further object relates to the method of forming and equally spacing the cutting lands in a screw cutting die of hexagonal shape by means of broaching, and whereby the correct shape is formed on the cutting faces of the lands.

The above objects are believed to be novel and to possess advantages over the present hexagonal shaped dies now in use.

Reference is had to the drawings in which—

Fig. 1 designates a blank of hexagonal form which has been cut from stock and from which the die is to be made.

Fig. 2 shows the same blank with an opening drilled in the center.

Fig. 3 indicates the opening for the adjusting screw.

Fig. 4 indicates the openings for receiving the broaching tool and which serve as clearance or chip-receiving openings.

Figure 7:
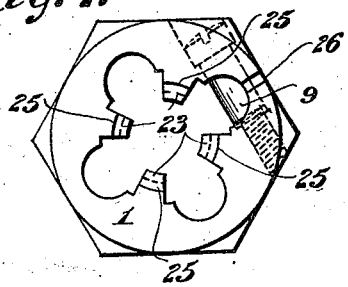

Fig. 7 after the ends of the lands of the die have been chamfered and the adjusting opening cut in the side.

Referring to the drawings in detail:

1 designates the blank which is perferably cut from stock material having six sides as shown. This blank is formed with a drilled opening 2 in its center. The next step is in forming the opening which extends from the face 3 to the face 4 and parallel with the face 5. This opening, as shown, is formed in three different sizes indicated at 6, 7, and 8 respectively for receiving the head, shank, and threaded end respectively of an adjusting screw indicated as a whole in Fig. 7 at 9. After this opening is formed the four holes indicated at 10, 11, 12, and 13 are drilled. These holes are preferably located so as to form a tangent with the center opening 2. They may be termed broach or clearance openings.

Figure 1:
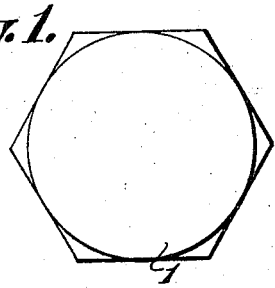
Figure 2:
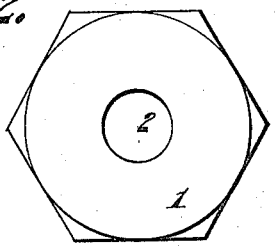
Figure 3:
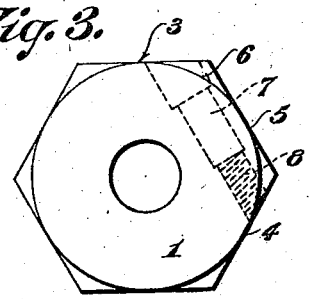
Figure 4:
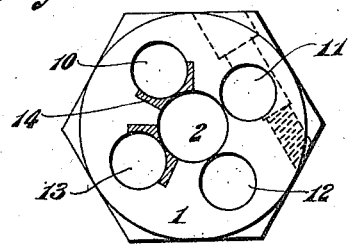
Figure 5:
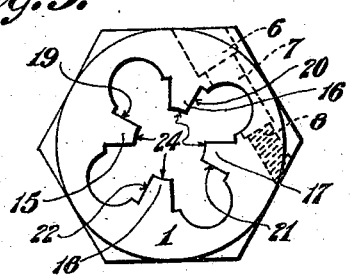
Fig. 5 shows the blank after the broaching tool has been used to form the thread cutting lands.
Figure 6:
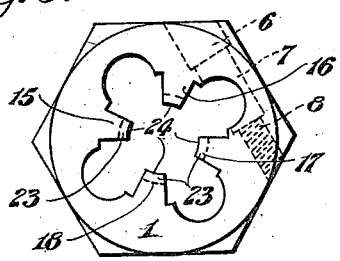
Fig. 6 shows the blank after the thread forming teeth have been cut.

The next step in the formation of the die is the broaching process or method by means of a suitable shaped broaching tool which simultaneously removes the metal indicated by the two shaded surfaces, 14 for example with the result that the four thread forming lands 15, 16, 17 and 18 are formed as indicated in Figs. 5, 6, and 7. It is to be understood that the shape or formation of the broaching tool is such that the correct shape or cutting faces 19, 20, 21, and 22 is imparted to the lands. The center opening 2 serves as a guide for the broaching tool. After the broaching process is completed the threads 23 of the die are formed on the inner projecting ends 24 of each of the lands as shown in Figs. 6 and 7. The opposite sides of the lands are now chamfered at a suitable angle indicated by the lines 25 in Fig. 7.

The final step in the process of making the die is cutting the opening 26 which permits of adjustment of the die by means of the screw 9, thus permitting the cutting of threads of different sizes. This screw operates to close the opening thus drawing the cutting threads and lands towards each other. In other dies the usual practice is to force them open or away from each other.

It is to be understood that the die can be used in a die stock if desired, or operated by a wrench if necessary in a small space. The screw 9 is positive in its operation since the normal tendency of the die is to spring open. The screw therefore operates to close the opening against the spring tension.

An important feature of my improvement is in the method of forming the lands and their cutting faces by broaching, and preferably by forming all of the lands at the same time.

While I have shown and described the die as being hexagonal in shape I wish it to be understood that I do not limit myself to any particular form or shape as I may use other forms, as desired.

What I claim is:

1. The method of forming the lands of a screw cutting die from a hexagonal blank which consists in first forming a plurality of openings through the blank, then passing a broach through the openings to space and form the lands and their cutting faces.

2. The method of forming a die from a hexagonal blank which consists in first forming a plurality of openings through the blank, then removing a portion of the material adjacent the openings to form the lands and their cutting faces, then forming the cutting threads on the lands.

3. The method of forming equally spaced lands in a thread cutting die which consists in forming a plurality of openings about a center opening, then passing a broach through the openings to form the equally spaced lands.

4. The method of forming a screw cutting die from a blank of suitable form which consists in first forming an opening through the center of the blank, then forming a plurality of openings through the blank which are equally spaced about the center opening, then passing a broach through the openings to form the lands, equally space the same and form the cutting faces thereon, then forming the cutting threads on the lands.

5. The method of forming a screw cutting die from a blank of hexagonal form which consists in first forming an opening through the center of the blank, then forming a plurality of openings through the blank which are equally spaced about the center opening, then passing a broach through the openings to form the lands, equally space the same and form the cutting faces thereon, then forming the cutting threads on the lands, then cutting an opening in one side of the blank.

6. The method of forming equally spaced lands and their cutting faces of a die by broaching which consists in equally spacing a plurality of openings about a center opening, then forming the lands and their cutting faces by passing a broach through all of the openings the center opening serving as a guide for the broach, whereby the faces of the lands are formed and equally spaced from each other by removing the material adjacent the openings, as described.

7. The method of forming a thread cutting die from a blank which consists in first forming an opening through the blank, then forming an opening to receive an adjusting screw, then forming a plurality of openings about the first opening, then passing a broach through the openings to form the lands, then forming the cutting threads on the lands, then chamfering the opposite sides of the lands and then cutting an opening from the outer surface to the opening which receives the adjusting screw, then inserting the screw in the opening.

DAVID B. MILLER.